May 3, 1938.  M. A. WHITING  2,116,420
CONTROL SYSTEM
Filed Dec. 1, 1936
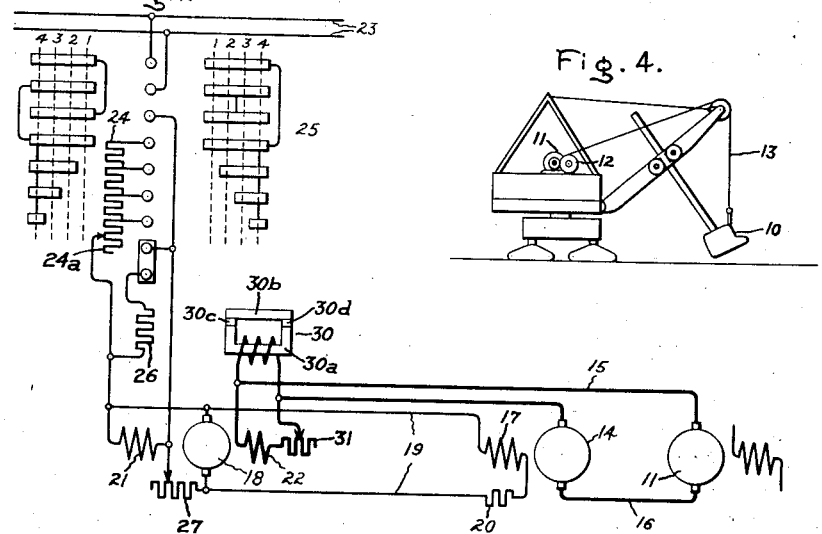
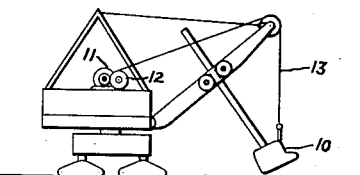
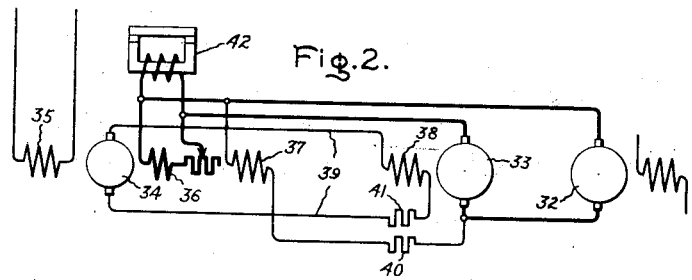
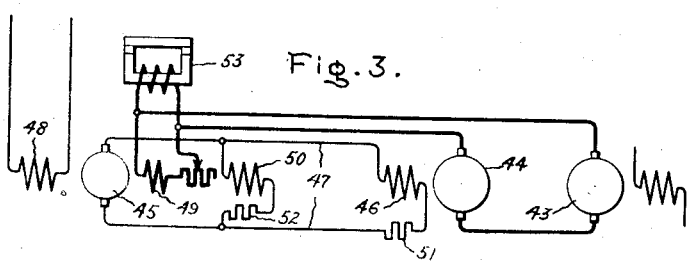
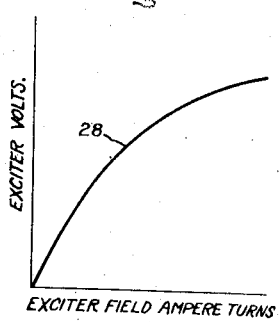
Inventor:
Max A. Whiting.
by Harry E. Dunham
His Attorney.

Patented May 3, 1938

2,116,420

UNITED STATES PATENT OFFICE 2,116,420

CONTROL SYSTEM

Max A. Whiting, Schenectady, N. Y., assignor to General Electric Company, a corporation of New York Application December 1, 1936, Serial No. 113,655

12 Claims. (Cl. 171—119)

This invention relates to control systems, more particularly to systems for controlling and regulating the load current of a generator, and it has for an object the provision of a simple, reliable and improved system of this character.

More particularly, the invention relates to constant current regulating systems for generators, and a more specific object is the provision of a system that is an improvement over the conventional three field drooping load characteristic generator.

Another aspect of this invention is that it constitutes an improvement on the invention disclosed in copending application Serial No. 113,654, Control systems, filed December 1, 1936, and assigned to the same assignee.

Another object of the invention is the provision of a constant current regulating system for generators which makes possible and feasible the use of a smaller, more easily operated and less expensive master switch and variable resistance than those required for direct control of the three field drooping characteristic generator.

A further object is to simplify and lower the cost of the generator by reducing the number of field windings on the generator while preserving the desired substantially constant current, drooping load characteristic.

Still another object of the invention is the provision of means for preventing the generator load current from exceeding the steady state characteristic value by too large an amount in response to sudden changes in load.

In carrying the invention into effect in one form thereof, the main generator, the load current of which is to be regulated, is provided with a single field winding, and an auxiliary generator, i. e. an exciter, is provided for exciting this winding. The auxiliary generator is provided with a main field winding connected to a separate source of excitation, and means are provided for applying to the auxiliary generator a cumulative component of excitation responsive to the voltage of one of said generators and a differential component of excitation responsive to the load current of the main generator. As thus excited, the auxiliary generator controls the excitation of the main generator in such a manner that the load current of the latter remains substantially constant over a wide range of voltage.

For the purpose of preventing the generator load current from greatly exceeding the steady state characteristic value under conditions of sudden overload, an inductive shunt is provided in connection with the series differential component of excitation for effecting rapid decline of the generator flux in response to sudden increases in the load.

In illustrating the invention in one form thereof, it is shown as embodied in a control system for a variable voltage generator utilized to supply current to the hoist motion motor of an electric shovel. The invention, however, has other applications.

For a better and more complete understanding of the invention, reference should now be had to the following specification and to the accompanying drawing in which Figs. 1, 2, and 3 are simplified diagrammatical representations of several embodiments of the invention, Fig. 4 is a very simplified diagrammatical illustration of an electric shovel illustrating an application, and Figs. 5 and 6 are charts of characteristic curves which facilitate an understanding of the invention.

Referring now to the drawing, the hoist motion of the dipper 10 of an electric shovel is effected by means of a motor 11 that is connected to drive a drum 12 upon which the hoist cable 13 is wound. The motor 11 is illustrated as a typically shunt wound, separately excited, direct current motor. It is supplied from a generator 14 to the armature terminals of which the motor armature is connected in a loop circuit by means of conductors 15 and 16.

Generator 14 is driven by suitable driving means (not shown) at a speed that is preferably substantially constant. As shown, generator 14 is provided with a single field winding 17. This field winding is separately excited by means of an exciter 18 to which the field winding 17 is connected by means of conductors 19. A permanent resistor 20 may be connected in circuit with the field winding 17. Typically this permanent resistance is preferably of somewhat larger resistance than the ohmic resistance of the field winding 17. The purpose of this resistance is to decrease the time constant of the field and to increase the speed of response of the generator flux.

Exciter 18 is provided with a separately excited field winding 21 and with an auxiliary field winding 22. The separately excited field winding 21 is supplied from a constant voltage bus represented by the two supply lines 23. A variable resistance 24 is included in the circuit of the separately excited field winding 21 and a reversing type master switch 25, of conventional construction, is provided for varying the effective amount of the resistance 24 and also for controlling the direction of current flow in the winding 21, thereby ultimately to control the speed and direction of the motor 11.

A discharge resistance 26 is provided for the separately excited field winding 21, and the master switch is provided with contacts which connect this discharge resistance across the field winding 21 when the master switch is in the off position in which it is illustrated.

The auxiliary field winding 22 is differential to the field winding 21 and is connected in series relationship in the loop circuit between the armatures of the generator 14 and the motor 11 so as to be excited by the load current supplied by the generator to the motor.

In order to add a component of self-excitation to the exciter 18, the field winding 21 is also connected to the armature terminals of the exciter through an adjustable resistor 27. The adjustable permanent resistor 27 may be of relatively high ohmic resistance so that the component of self-excitation will be relatively small.

If exciter 18 is designed for a substantial degree of saturation at its normal maximum voltage, the characteristic of generator volts versus generator amperes is influenced by the additive effects of the generator saturation and the exciter saturation in a manner and to an extent such that the necessary component of exciter self-excitation will be proportionately much less than in a conventional directly excited three-field generator having substantially the same characteristic of generator volts versus generator amperes. In fact, in some cases exciter 18 will not need any component of self-excitation. In some cases it may be found that a relatively small component of self-excitation may be required. This may be provided by connecting field 21 to the armature terminals of exciter 18 through a resistor 27.

In some specific embodiments of the conventional three-field generator, suitable characteristics at reduced voltages are obtained by confining the variation of resistance to the separately excited field circuit, but leaving the self-excited field circuit resistance unaffected by the controller movement. In other specific embodiments the preferred characteristics are obtained by arranging the controller to vary additionally the resistance in series with the self-excited field.

Correspondingly in the present invention, in some embodiments only the resistor 24 may be arranged to be varied by the controller but in others it may be preferable to add, in series with resistor 27 between field 21 and the generator armature 18 a variable resistor which is controlled by the controller. The manner of making such addition will be evident to those skilled in the art and for simplicity of the drawing this addition is not shown.

As will appear hereinafter, the voltage of exciter 18 is variable but the voltage of supply mains 23 is constant. It is therefore essential that both permanent resistors 24a and 27 be used in order to minimize the exchange of current between mains 23 and the exciter. By the use of both of these permanent resistors a greater latitude of choice is offered for the designed voltages of mains 23 and exciter 18.

For another reason it will sometimes be necessary and will often be preferable to use both permanent resistors 24a and 27. Unless the time-constant of the field of exciter 18 is much less than that of the field of generator 14 the flux changes of the generator will be substantially more sluggish than those of a comparable generator having a conventional excitation system. To reduce the time-constant of the exciter to a relatively negligible value, each of the resistors 24a and 27 must be much greater than that of field winding 21. As far as concerns the arrangement for providing sufficiently fast response of exciter flux the voltages of supply mains 23 and of the exciter at its no-load maximum may be designed to be equal or unequal provided at each is sufficiently greater than the IR drop of winding 21 at this no-load maximum voltage.

Typically the response of the field of exciter 18 will be fast enough if the parts concerned are proportioned as follows: At the normal maximum field strength of exciter 18 (i. e. at the full position of the controller and no current in field winding 22) let the voltage of exciter 18 be not less than five times the IR drop of field winding 21, and let the voltage of supply mains 23 be also not less than five times the IR drop of field winding 21.

With the foregoing understanding of the apparatus and its organization in the system, the operation of the system itself will readily be understood from the following description: The hoist motor 11 is started from rest and accelerated by operating the master switch to the left from the central off position in which it is shown to the fourth hoisting position. The circuit of the discharge resistance 26 is first opened and as the master switch passes through its successive positions, the field winding 21 is connected to the constant voltage bus 23 and the resistance 24 is short-circuited in steps, thereby to increase the excitation of the exciter 18. As a result, the excitation of the generator 14 is increased and likewise the motor 11 is started from rest and accelerated to a running speed. In the fourth or full running speed position of the master switch, all of the resistance 24 is short-circuited except the permanent portion 24a. This portion of the resistance is maintained in the circuit of the field winding 21 for the purpose of decreasing the time constant of the field winding and increasing the speed of response of the exciter flux.

The relationship between the field ampere turns of the exciter and its generated voltage is represented by the curve 28 in Fig. 5 in which ordinates represent volts and abscissae represent field ampere turns.

The arrangement of the field windings on the exciter 18 produces a drooping voltage current characteristic in the generator 14 in which the current of the generator is maintained substantially constant over a wide range of voltages. In this arrangement, the differential action of the field winding 22 on the exciter as the generator load current increases, will reduce the exciter voltage at any given position of the master switch. Since the separately excited field winding 21 is connected through resistor 27 to the exciter armature terminals, the reduction in exciter voltage produced by the increased generator load current traversing the differential field winding 22 will further reduce the excitation of the exciter and thus the voltage of the exciter 18 will be still further modified. As a result, the excitation of the generator field 17 will be correspondingly reduced. Thus the load current of the generator remains substantially constant over a wide range of voltages. That is to say, for relatively large changes in voltage, the corresponding changes in generator load current are relatively small. This characteristic of the generator is illustrated in Fig. 6 by the curve 29, the ordinates of which represent generator voltage and the abscissae of which represent generator current.

Under conditions which do not change too rapidly, the generator characteristic protects the generator itself, the motor and the hoist mechanism and structure against abnormal overloads. In the hoist motion of a shovel, the motor may be stalled rather suddenly from a substantial speed while the master switch remains at full speed position. Under such a condition, the generator flux needs to decline rapidly. Where the differential series function consists of turns of generator load current about the exciter poles as in the modification of Fig. 1, the indirectness with which this function is applied tends to cause the generator flux response to be somewhat sluggish when the motor is thus suddenly stalled. For example, consider the dipper digging through the bank at a fairly high speed with generator voltage and current at the values represented by the point A in Fig. 6, and further assume that the dipper suddenly fetches up against a large boulder or a comparatively unbroken rock stratum. As there is relatively little yield in the mechanism and roping system, the hoist stalls almost instantly and the generator ought accordingly to "lie down" to point B on the curve 29 in Fig. 2 without seriously exceeding the steady-state volt ampere characteristic between points A and B. The inductance of the generator field, however, is considerable and the additional effect of the exciter field inductance may not be altogether negligible. Consequently, when the dipper is snagged in this manner, the current may rise momentarily to an abnormal value.

A very moderate transient excess of generator current over the steady-state value tends to benefit the digging ability of the dipper, particularly in rocky digging, and in some installations may be quite without detrimental effect. In other installations, however, transient overloads such as these may be more severe and may be objectionable. They may contribute to commutation troubles. They cause severe shocks to shovel machinery and structure and tend to increase the maintenance and shorten the life of the shovel. Slip couplings have been used, intended to hold at all torques below that of the steady-state stalled current and to slip at all higher torques. Slip couplings that have thus far been applied do not provide a complete cure of the difficulty.

In order to prevent the generator load current from rising to an abnormal value under such conditions of overload, a highly inductive shunt 30 is provided and its winding is connected in parallel with the differential series field winding 22. The winding of this inductive shunt is of substantially lower resistance than the resistance of the differential series field winding 22, and its inductance is much greater so that its time constant L/R is much greater. To illustrate by way of example, the shunt may be so proportioned that 90% of the steady state load current traverses the winding of the inductive shunt and only 10% of the steady state current flows in the differential series field winding itself. It is to be understood, however, that this is only an example and that a wide range of proportions is available to the skilled worker in the art. The differential series field winding will have proportionally more turns so as to provide the requisite ampere turns. With such an arrangement, when the load current begins to rise abruptly, nearly all the increment of current is momentarily choked out of the inductive shunt and must traverse the differential series field winding. Thus, a disproportionately high transient demagnetizing effect is imposed by the differential series field winding which results in a rapid reduction of the generator flux and thus prevents a severe transient overload.

As will be understood by those experienced in the design of inductive shunts for use in direct-current circuits, inductive shunt 30 should preferably include in its magnetic path one or more air gaps, so as to minimize the effect of saturation and obtain an inductance which is reasonably uniform for all current increments up to the maximum. As shown, inductive shunt has a magnetic circuit composed of two members 30a and 30b separated at two faces by non-magnetic shims 30c and 30d. If the inductance provided in element 30 is found, in a specific installation, to be greater than desired it may readily be decreased by substituting thicker non-magnetic shims so as to increase the air gaps. If the members of the magnetic circuit were entirely unlaminated, for example, if they were fabricated from bar stock, a substantial part of the inductive effect expected of winding of shunt 30 might be lost by reason of substantial eddy currents induced in such unlaminated magnetic members. The magnetic members of shunt 30 should therefore preferably be of laminated construction.

It may be convenient to include in series with series field winding 22 an adjustable resistor 31, and to design field winding 22 to have its normal degree of effectiveness when approximately one-half of resistor 31 is in circuit. Thus if it becomes desirable to increase or decrease the effect obtained from field winding 22, this may be done by connecting less or more of resistor 31 in circuit.

If this invention is applied to the crowd motion of a shovel the inductive shunting of field winding 22 by inductive shunt 30 may or may not be preferable, according to the particular conditions. In some other applications, for example, in the swing motion of a shovel the sudden stalling, or "snagging" of the motion does not occur, hence the inductive shunting will not be preferred.

The system shown in the modification of Fig. 2 is similar to the system of Fig. 1 and differs from it primarily in that an additional field winding is provided on the exciter for applying the component of self-excitation. In the modification of Fig. 2, the motor 32, generator 33, and exciter 34 correspond with the motor 11, generator 14 and exciter 18 of Fig. 1. Exciter 34 is provided with a separately excited field winding 35. This field winding is supplied from a separate source of excitation through a variable resistance controlled by a reversing type master switch. Since the variable resistance, master switch, and separate source of excitation are identical with corresponding elements in Fig. 1, they are omitted from Fig. 2 for the purpose of simplification. Field winding 35 may be provided with a discharge resistance but it is not connected to the armature terminals of the exciter as in Fig. 1. Exciter 34 is further provided with a differential series field winding 36 connected in the loop circuit between the armatures of the generator 33 and the motor 32 so that it is traversed by the load current exchanged between the generator and the motor. The component of self-excitation for the exciter 34 is provided by means of a field winding 37 connected across the generator armature so as to be responsive to the voltage of the generator. This field winding 37 is arranged for cumulative action with respect to the field winding 35.

As shown, the generator 33 is provided with a single field winding 38 which is connected to the armature terminals of the exciter 34 by means of conductors 39. Permanent resistances 40 and 41 are respectively connected in the circuits of the field windings 37 and 38.

Resistor 41 has preferably an ohmic value no less than that of field winding 38. The resistor corresponding to resistor 24a of Fig. 1 has preferably an ohmic value not less than approximately five times that of field winding 35, and resistor 40 has preferably an ohmic value not less than approximately five times that of field winding 37. The purpose of these permanent resistances is to decrease the time constants of the field windings and thereby to increase the speed of response of the exciter flux and of the generator flux.

The volt ampere characteristic of the generator 32 thus produced by this arrangement of field windings on the exciter 34 is generally similar to the characteristic represented by the curve 29 in Fig. 6.

For reasons similar to those explained hereinbefore in connection with Fig. 1, it may sometimes be desirable to provide the arrangement of Fig. 2 with inductive shunting of the differential field. This may be done by inductive shunt 42 generally similar to inductive shunt 30 of Fig. 1.

The operation of the system of Fig. 2 is similar to that of the system of Fig. 1 with the exception that the component of self-excitation is furnished by an additional field winding 37 excited by the generator voltage.

The modified form disclosed in Fig. 3 is also generally similar to the systems of Figs. 1 and 2 and differs from them primarily in that the component of self-excitation is furnished by an additional winding on the exciter excited by the voltage of the exciter itself. In Fig. 3 the driving motor 43, its supply generator 44 and exciter 45 are similar to the corresponding elements of Figs. 1 and 2. As in the other modifications, generator 44 is provided with a single field winding 46 that is supplied from the exciter 45 to the armature terminals of which it is connected by means of conductors 47. Likewise exciter 45 is provided with a separately excited field winding 48 supplied from a separate constant excitation bus (not shown). A variable resistance similar to the resistance 24 of Fig. 1 is connected in the circuit of the field winding 48, and a reversing type master switch similar to the master switch 25 is provided for varying this resistance in steps and for controlling the direction of current flow through the winding 48 thereby to control the speed of the motor 43 and its direction of rotation. Exciter 45 is also provided with a differential series field winding 49 similar to the differential windings 22 and 36 of Figs. 1 and 2. Field winding 49 is connected in the loop circuit between the armatures of the generator 44 and motor 43, and it is connected so as to act differentially with respect to the excitation of the field winding 48. The component of self-excitation is provided by means of an additional field winding 50 connected across the armature terminals of the exciter so as to be excited by the voltage of the exciter itself. Field winding 50 acts cumulatively with respect to the excitation of the field winding 48.

Permanent resistances 51 and 52 are connected in series relationship with field windings 46 and 50 for the purpose of speeding up the response of the generator and exciter fluxes.

Field winding 48 may be provided with a discharge resistance.

The arrangement of field windings on the exciter 45 produces the same general type of volt ampere characteristic in the generator 44 that is represented by the curve 29 of Fig. 6. The change of voltage of the generator 44 in response to changes of load current tends to be more prompt than does the change of voltage of the generator 33 in the modified form of Fig. 2. However, an inductive shunt may still be desirable in some cases to provide the desired speed of response and if such is the case, an inductive shunt 53 may be provided. The description of the inductive shunt 30 in Fig. 1 applies equally to the inductive shunt 53 in Fig. 3.

The operation of the system of Fig. 3 is generally similar to the operation of the system of Fig. 1 with the exception that the component of self-excitation for the generator 45 is provided by means of the additional field winding 50 excited by the voltage of the exciter itself. Thus a description of the operation is unnecessary.

Although in accordance with the provision of the patent statutes this invention is described as embodied in concrete form, it will be understood that the connections and arrangements shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent in the United States is:

1. A control system comprising in combination, a generator provided with a field winding and means for maintaining the load current of said generator substantially constant over a wide range of values of generator voltage, comprising an exciter for supplying substantially the sole excitation to said winding, said exciter being provided with a separately excited field winding, a series differential winding excited by the load current of said generator, and an inductive shunt connected to said series differential winding.

2. A control system comprising in combination, a main generator provided with a field winding, an auxiliary generator for exciting said winding and provided with a separately excited field winding, means responsive to the voltage of one of said generators for supplying a cumulative component of excitation to said auxiliary generator and a series differential field winding excited by the load curernt of said main generator so that said load current remains substantially constant over a wide range of voltage, an inductive shunt connected to said differential winding, said shunt having a time constant that is greater than the time constant of said differential winding thereby to overexcite said differential winding during sudden transient increases in the load current of said main generator, and a reversing master switch for controlling the direction of current flow of said separately excited winding.

3. A control system comprising in combination, an electric motor, a generator for supplying said motor, a field winding on said generator, means for maintaining the current supplied to said motor substantially constant over a wide range of generator voltage comprising an auxiliary generator for exciting said winding, said auxiliary generator having a separately excited field winding, means responsive to the voltage of one of said generators for supplying a cumulative component of excitation to said auxiliary generator and a series differential winding excited by the load current of said main generator, and an inductive shunt connected to said differential winding, said shunt having an inductance that is relatively high and a resistance that is relatively low in comparison with the inductance and resistance respectively of said differential winding, a variable resistance in said separately excited field circuit, and a reversing master switch for varying said resistance and controlling the direction of current flow in said separately excited winding thereby to control the speed and direction of rotation of said motor.

4. A control system comprising in combination, a generator having a field winding, a source of supply and means for maintaining the load current of said generator substantially constant comprising an exciter for exciting said winding, said exciter having a series differential winding excited by the load current of said generator and a separately excited winding, connections from said separately excited winding to said source, connections from said separately excited winding to the armature terminals of said exciter thereby to provide a component of self-excitation for said exciter and a permanent resistor connected in each of said connections.

5. A current regulating system comprising in combination, a generator provided with a field winding, and means for maintaining the load current of said generator substantially constant over a wide range of voltage comprising an exciter for exciting said winding having a differential series winding excited by the load current of said generator and a winding having connections to a separate source and connections to the armature terminals of said exciter to provide in said last mentioned winding a component of separate excitation and a component of self-excitation, a permanent resistance in each of said connections and an inductive shunt connected to said differential winding, said shunt having an inductance that is relatively high and a resistance that is relatively low in comparison with the inductance and resistance respectively of said differential winding.

6. A control system comprising in combination, a generator provided with a field winding and means for maintaining the load current of said generator substantially constant over a wide range of voltage comprising an exciter for exciting said winding having a differential series field winding excited by the load current of said generator, and a winding having connections to a separate source of excitation and connections to the armature terminals of said exciter to provide in said last-mentioned winding a component of separate excitation and a component of self-excitation, a permanent resistor included in each of said connections and an inductive shunt connected to said differential winding and having a time constant that is large in comparison with the time constant of said differential winding thereby to provide a substantial over-excitation of said differential winding during sudden increases in generator load, and a reversing master switch in the connections between said separately excited winding and said source.

7. A control system comprising in combination, a generator having a field winding, means for maintaining the load current of said generator substantially constant over a wide range of voltage comprising an exciter for exciting said winding, said exciter having a differential series field excited by the load current of said generator and a field winding having connections to a separate source and connections to the armature terminals of said exciter to provide in said last mentioned winding a component of separate excitation and a component of self-excitation, a permanent resistor included in circuit with each of said connections and an inductive shunt connected to said differential field winding to produce overexcitation thereof during sudden increases of generator load, a variable resistance in the connections between said separately excited field winding and said source, a discharge resistance for said separately excited field winding, and a reversing master switch for connecting said discharge resistance across said separately excited field in the off position of said switch and for controlling said variable resistance and the direction of current flow in said separately excited winding.

8. A regulating system comprising in combination, a generator provided with a field winding, an exciter for exciting said winding, said exciter having a separately excited field winding, a cumulative winding excited by the voltage of said generator, and a differential series winding excited by the load current of said generator whereby the load current of said generator is maintained substantially constant over a wide range of generator voltage.

9. A current regulating system comprising in combination, a generator provided with a field winding, and means for maintaining the generator load current substantially constant over a wide range of voltages comprising an exciter for exciting said winding, said exciter having a separately excited field winding, a cumulative winding excited by the voltage of said generator and a differential series winding excited by the load current of said generator, and an inductive shunt connected to said differential winding having a time constant that is relatively large in comparison with the time constant of said differential winding thereby to produce substantial overexcitation of said series winding and rapid demagnetization of said exciter in response to sudden increases in the generator load.

10. A control system comprising in combination, an electric motor, supply means for said motor comprising ( generator provided with a field winding, an exciter for exciting said winding, said exciter having a separately excited winding, a cumulative winding excited by the voltage of said generator and a differential series winding excited by the load current supplied to said motor whereby said load current is maintained substantially constant over a wide range of voltage, a variable resistance in said separately excited field circuit, and a reversing master switch in said separately excited field circuit for controlling said resistance and the direction of current flow in said circuit thereby to control the speed and direction of rotation of said motor.

11. A current regulating system comprising in combination, a generator provided with a field winding, means for maintaining the load current of said generator substantially constant over a wide range of voltage comprising an exciter for said winding having a separately excited field winding, a cumulative field winding energized by the voltage of said generator and a differential series field winding energized by the load current of said generator, and an inductive shunt connected to said differential winding, said shunt having a time constant that is relatively large in comparison with the time constant of said differential winding, and permanent resistances connected in the circuits of said generator field winding, said separately excited field winding and said cumulative field winding for increasing the speed of response of said field windings.

12. A control system comprising in combination, a generator provided with a field winding, an exciter for said winding provided with a separately excited field winding, a cumulative self-excited field winding and a differential series field winding excited by the load current of said generator whereby said load current is maintained substantially constant over a wide range of voltage, and an inductive shunt connected to said differential winding having a time constant that is large in comparison with the time constant of said differential winding thereby to produce overexcitation of said differential winding and rapid demagnetization of said exciter and generator in response to sudden increases in generator load so as to prevent substantial departure of said load current from the steady state characteristic value.

MAX A. WHITING.